United States Patent [19]

Wu

[11] Patent Number: 5,391,587
[45] Date of Patent: Feb. 21, 1995

[54] FLUORINATED PHOTOINITIATORS AND THEIR APPLICATION IN UV CURING OF FLUORINATED MONOMERS

[75] Inventor: Chengjiu Wu, Morristown, N.J.

[73] Assignee: AlliedSignal Inc., Morris Township, Morris County, N.J.

[21] Appl. No.: 54,607

[22] Filed: Apr. 30, 1993

Related U.S. Application Data

[63] Continuation of Ser. No. 805,156, Dec. 11, 1991, abandoned.

[51] Int. Cl.⁶ .............................................. C08F 2/46
[52] U.S. Cl. ...................................... 522/40; 522/41; 522/42; 522/43; 522/44; 522/45
[58] Field of Search ....................... 522/40, 41, 42, 43, 522/44, 45

[56] References Cited

U.S. PATENT DOCUMENTS

| | | | |
|---|---|---|---|
| 2,642,416 | 6/1953 | Ahlbrecht | 526/245 |
| 3,280,147 | 10/1966 | Olah | 549/483 |
| 4,985,473 | 1/1991 | Williams et al. | 522/89 |

FOREIGN PATENT DOCUMENTS

0040923 12/1981 European Pat. Off. .
0132869 2/1985 European Pat. Off. .

OTHER PUBLICATIONS

"Electric Dipole . . . " Bock et al. Chem. Abst. #65563m, vol. 79, No. 11, 1973.

Mukai, "Electric Insul. . . . ", Chem. Abst. #188714d, vol. 104, No. 22, Jun. 2, 1986.
Masaoka, "2-[[(4-Perfluoro . . . ", Chem. Abst. #207286j, vol. 104, No. 23, Jun. 9, 1986.
Chen, "Generation . . . ", Chem. Abst. #7788m, vol. 110, No. 1, Jan. 2, 1989.
Sugawara, "Optically Active . . . ", Chem. Abst. #243199g, vol. 112, No. 26, Jun. 25, 1990.
Sugawara, "Optically Active . . . ", Chem. Abst. #88377p, vol. 113, No. 10, Sep. 3, 1990.
Sugawara, "Optically Active . . . ", Chem. Abst. #106597s, vol. 113, No. 12, Sep. 17, 1990.
Sugawara, "Optically Active . . . ", Chem. Abst. #15017g, vol. 114, No. 2, Jan. 14, 1991.
"Photoinitiators soluble in highly fluorinated monomers", D. K. McIntyre, CA Selects: Photosensitive Polymers, Issue 14, (1992).
Hult et al., "Photocuring in Air Using a Surface Active Photoinitiator", ACS Polymer Preprints, 25-1, 329 (1984).

*Primary Examiner*—Marion E. McCamish
*Assistant Examiner*—Mark A. Chapman
*Attorney, Agent, or Firm*—Michele G. Mangini; Roger H. Criss

[57] ABSTRACT

Photoinitiators having a terminal fluoroalkyl moiety are useful for photopolymerizing and photocuring fluorinated as well as non-fluorinated monomers, especially fluorinated acrylic monomers.

6 Claims, No Drawings

FLUORINATED PHOTOINITIATORS AND THEIR APPLICATION IN UV CURING OF FLUORINATED MONOMERS

This application is a continuation of application Ser. No. 07/805,156, filed Dec. 11, 1991, now abandoned.

FIELD OF THE INVENTION

This invention relates to photoinitiators having a fluoroalkyl moiety, which are useful for photopolymerizing and photocuring fluorinated as well as non-fluorinated monomers, especially-fluorinated acrylic monomers.

BACKGROUND OF THE INVENTION

Polymer coatings which can be cured by exposure to ultraviolet (UV) or other radiation have achieved a high degree of practical utility since they offer many specific advantages. UV curing systems can be comprised of 100% reactive components, thereby avoiding the need for solvents and their safety and environmental hazards. UV curing is faster and more cost effective than alternative processes, such as thermal curing. Further, curing compositions can readily be tailored to meet specific application requirements since available functional monomers and oligomers cover a wide range of properties.

Photocuring coating compositions are usually comprised of three components: the monomer, a photoinitiator, and (optionally) additives. The monomer is an unsaturated or cyclic organic compound which can undergo polymerization. It can be a single compound or a mixture of compounds. Typical monomers employed in photocuring coating compositions include styrene-unsaturated polyesters, acrylates, thiol-enes, allyl ethers, vinyl ethers, epoxides, and the like. The monomers are preferably bi- or multi-functional, to form a highly cross-linked network providing maximum strength and stability.

The photoinitiators are photosensitive compounds which absorb UV radiation and produce activated species—typically free radicals (for styrene, acrylate and allyl monomers) or cationic in nature (for vinyl ethers and epoxides)—to initiate polymerization or cross-linking. These photoinitiators can be used as a single compound or a mixture of different compounds, to meet desired curing characteristics.

The additives include the usual pigments, dyes, inhibitors to prevent polymerization during storage, stabilizers to reserve optimum properties and prolong service life, regulators to adjust flow characteristics, and the like.

Acrylic coatings, including those based on mono- and multi-functional acrylates, methacrylates, and acrylic oligomers derived from epoxides, polyesters, and polyurethanes combine the advantages of superior film properties (clarity, strength, adhesion, gloss, etc.); adjustable flow properties for easy application; and rapid curing. Acrylic coatings based on fluoroalkyl acrylic ester monomers (herein sometimes referred to as "F-acrylates") possess highly desirable properties such as high thermal and chemical stability, low surface energy, low friction, and low refractive index. Such advantageous properties are dependent on fluorine content; they tend to improve with increasing fluorine content. For example the refractive index of amorphous fluoroacrylic polymers decreases with increasing length and number of the fluoroalkyl chains. Unfortunately, the photoinitiators conventionally employed for polymerizing the usual acrylic monomers are not miscible with some highly fluorinated acrylate monomers, and there are no ready means for photocuring such acrylate monomers. UV curing of such fluorinated acrylate monomers without the aid of a photoinitiator, while feasible, gives less than optimum properties, is time consuming and expensive.

Accordingly, it is an object of this invention to provide new photoinitiators which are compatible with highly fluorinated acrylate monomers.

SUMMARY OF THE INVENTION

In accordance with one aspect of this invention, there are provided fluorinated photoinitiators of the formula

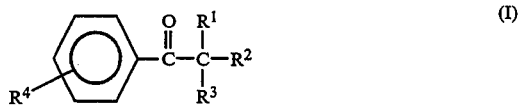

wherein at least one of the $R^1$ through $R^4$ groups is a terminally fluorinated group of the formula $$-W-(X)_q-Y-R_f$$

wherein
W and Y are independently selected groups of the formula

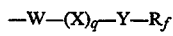

$-(CH_2)_p-$ $-(CH_2CH_2O)_p-$ $-[CH_2CH(OH)CH_2O]_p-$ wherein
p is an integer of from 0 to 10, and —Ar—, wherein Ar is

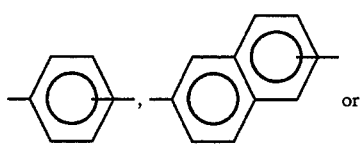

X is —O—, —OC(O)—, —C(O)O— or —C(O)—; q is 0 or 1; and
$R_f$ is selected from the group consisting of

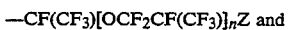

wherein
m and n are integers of from 0 to 50, and
Z is H or F;
wherein the remaining $R^1$ through $R^4$ groups, if any, are independently selected from the group consisting of
H, —OH, R, —OR, —$NR_2$ and

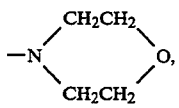

wherein R is alkyl, straight chain, branched or cyclic, having from 1 to 20 carbons; phenyl, biphenyl or naphthyl;

with the proviso that not more than 2 of the $R^1$ through $R^4$ groups may be H.

In another aspect, this invention provides a method for photopolymerizing unsaturated monomers, especially fluorinated monomers, including polyfluorinated alkylacrylates and methacrylates as well as poly(fluorooxyalkyl) acrylates and methacrylates, which comprises mixing said monomers with an effective amount of the above-described fluorinated photoinitiators, and subjecting the mixture to actinic radiation, conveniently UV radiation.

The fluorinated acrylic monomers which can be thus polymerized are well known compounds. They include, but are not limited to, to fluoroacrylates of the formula $$R_f-X-A \qquad (II)$$

wherein $R_f$ is a per- or polyfluorinated saturated, monovalent, nonaromatic, aliphatic radical which may be straight chain, branched or cyclic;

A is an ethylenically unsaturated group selected from the group consisting of

—O—C(O)—CR=CH$_2$;

—O—C(O)NH—(CH$_2$)$_a$—O—C(O)—CR=CH$_2$; and

—O—C(O)NH—R'—NHC(O)O—(CH$_2$)$_a$—O—C(O)—CR=CH$_2$;

wherein

R is H or CH$_3$;

a is an integer of from 2 to 6;

R' is a divalent aliphatic or cycloaliphatic bridging group having 2 to 14 carbon atoms, or an aryl group having 6 to 14 carbon atoms; and X is a divalent bridging group selected from the group consisting of —SO$_2$—N(R")—(CH$_2$)$_b$—;

—(CH$_2$)$_{b1}$—; and

—C(O)—N(R")—(CH$_2$)$_b$— wherein b is an integer of from 2 to 12;

$b^1$ is an integer of from 1 to 12;

R" is H; lower alkyl having 1 to 4 carbons; or —(CH$_2$)$_c$—A wherein A is as described above and c is 2 or 3;

with the proviso that when R" is —(CH$_2$)$_c$—A, then b is 2 or 3, and with the further proviso that when $R_F$ contains 6, 7 or more than 7 carbon atoms there are no more than 6, 10 or 20 atoms respectively in the chain between $R_f$ and the ester oxygen of the acrylate or methacrylate group. For a more detailed description of the acrylic monomer of formula (II), above, and specific preferred embodiments encompassed within this formula, reference is made to U. S. Pat. No. 4,985,473 issued Jan. 15, 1991 to Williams et al.

Further monomers suitable for actinic-radiation induced polymerization utilizing the above-described fluorinated photoinitiators include, but are not limited to, those having the formula $$Z-R_f^2-Y-(A)_n \qquad (III)$$

wherein

A is as defined in connection with Formula II, above;

Y is

—(CH$_2$)$_{b1}$—, —C(O)—N(R$^2$)—(CH$_2$)$_b$— or
—CH$_2$—CH—CH$_2$— wherein b is an integer of from 2 to 12;

$b^1$ is an integer of from 1 to 12;

$R^2$ is hydrogen or alkyl having 1 to 4 carbon atoms (preferably methyl or ethyl) or —(CH$_2$)$_c$—A wherein A is as defined in connection with formula II, above, and c is an integer of from 2 to 3, with the proviso that when $R^2$ is —(CH$_2$)$_c$—A, then b is 2 or 3;

$R_F^2$ is a divalent poly(fluorooxyalkylene) group having a number average molecular weight from about 500 to 20,000, or higher, and preferably of from about 1,000 to about 10,000; and Z is CF$_3$O—, CF$_3$OCF(CF$_3$)O—, or —Y—A wherein Y and A are as defined in connection with formula II, above.

$R_F^2$ desirably comprises highly fluorinated polyethers having randomly distributed units of the formula —CF$_2$O—, —CF$_2$CF$_2$O— and —C$_3$F$_6$O—, and may also have incorporated therein groups of the formula —CF$_2$—CF$_2$—CF$_2$—CF$_2$O—, —CF$_2$— and —C$_2$F$_4$—, all as described in U.S. Pat. No. 4,985,473 issued Jan. 15, 1991 to Williams et al.

DETAILED DESCRIPTION OF THE INVENTION

The following detailed description sets forth the preferred embodiments and the best mode presently contemplated for its practice.

The fluorinated photoinitiators (herein also referred to as "F-photoinitiators") of the present invention are based on known fluorine-free photoinitiators of the aromatic ketone type. A fluorine-containing moiety having a terminal fluoroalkyl group is attached to the photoinitiator by reacting functional group(s) in the fluorinated molecule with functional group(s) of the photoinitiator or its precursor in such a way that the connection will not significantly depress the photon-absorption and radical-formation characteristics. The fluorine-free photoinitiators are well known for vinyl and acrylate polymerization.

Selection of the mono or multiple functionalized fluoroalkyl starting materials for providing the fluorine-containing moiety for the F-photoinitiators of the present invention is, inter alia, based on consideration of the reactivities of their functional groups. Suitable functional groups include, but are not limited to, hydroxy, acyl fluoride, acyl chloride, carboxyl, halogen (bromide and iodide), isocyanate, and epoxy groups. The connecting linkage may be direct C—C bonding, or an ester, ether, acetal, or urethane linkage. For improved processibility, a branched fluoroalkyl chain containing 5–20 carbons and some etheric linkages is preferred. If the fluoroalkyl chain is short (contains about 3 to about 7 carbon atoms), then the F-photoinitiators are soluble in normal acrylate system and can act as a surface-active initiators, as to be described in more detail, infra. When the fluoroalkyl chain is long (contains more than about 6 carbon atoms), then the F-photoinitiators are soluble and photoactive in highly fluorinated acrylic monomers of the type described, supra.

The method for making the F-photoinitiators of the present invention depends on the type of linkage by which the fluorinated moiety is attached to the aromatic ketone. The term "photoinitiator", as used in the following description, refers to the non-fluorinated aromatic ketone starting material.

F-photoinitiators having an ester linkage can be made by esterification of fluorinated carboxylic acids (carboxylic acid with a fluoroalkyl group) with hydroxyl functionalized photoinitiators. The hydroxyl group may be attached to the α-, β- or more remote positions of the aromatic ketone moiety. We found the F-photoinitiators made by esterification at α-position are less reactive than at the β- or more remote positions unless a hydrogen donating compound such as an amine is co-existing with the former. The esterification can be performed in an aprotic solvent, such as methylene chloride, and in the presence of an acid absorber, preferably a tertiary amine such as triethylamine. The reaction is usually run at room temperature. The esterification process may be exemplified by the following scheme:

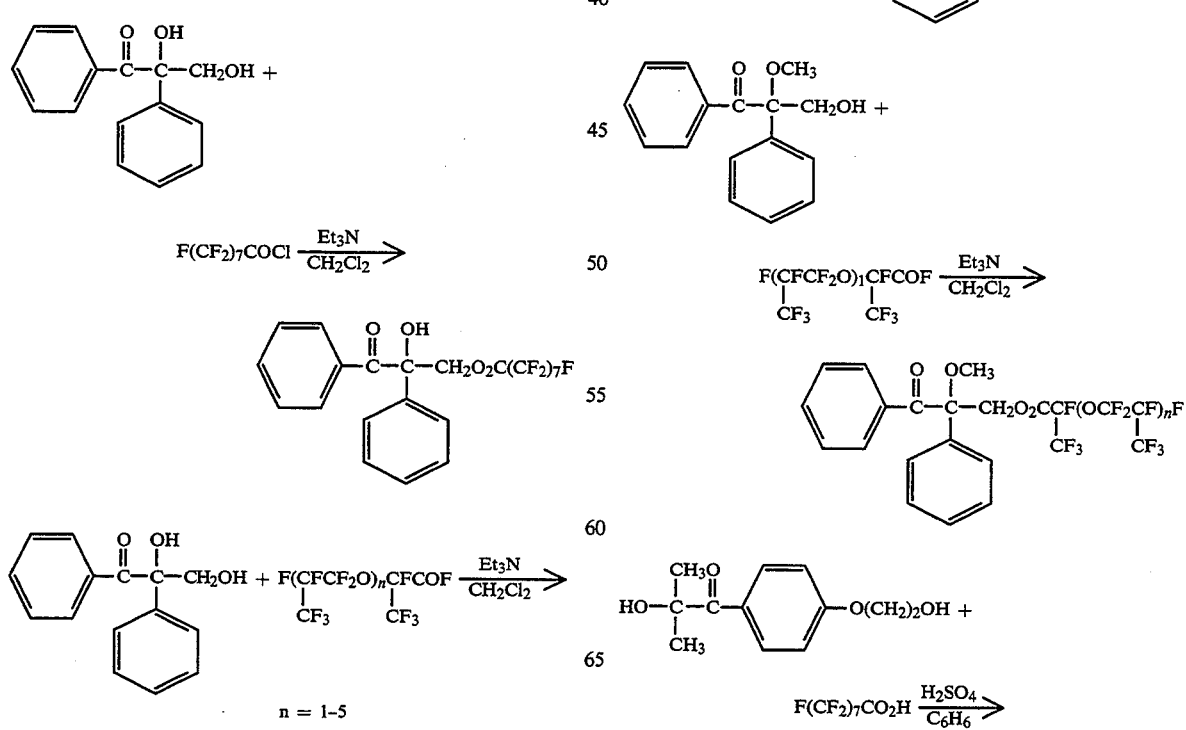

-continued $$HO-\underset{CH_3}{\underset{|}{\overset{CH_3O}{\overset{|}{C}}}}-\overset{O}{\overset{\|}{C}}-\text{C}_6\text{H}_4-OCH_2CH_2O_2C(CF_2)_7F$$

F-Photoinitiators having an ether linkage can be made by reacting a hydroxyl functionalized photoinitiator with a fluoroalkyl terminated alkyl halide, preferably a bromide or iodide, more preferably an iodide, or by reacting the hydroxyl group with a fluoroalkylepoxide. The process for making these ether type products may be exemplified by the following scheme:

Ph-CO-C(CH$_3$)$_2$-OH + F(CF$_2$)$_8$CH$_2$CH$_2$I $\xrightarrow{\text{NaH}}$

Ph-CO-C(CH$_3$)$_2$-OCH$_2$CH$_2$(CF$_2$)$_8$F

Ph-CO-C(cyclohexyl)-OH + F(CF$_2$)$_n$CH$_2$CH—CH$_2$ (epoxide) $\xrightarrow{\text{H}_2\text{SO}_4}$ n = 4–20

Ph-CO-C(cyclohexyl)-OCH$_2$CH(OH)CH$_2$(CF$_2$)$_n$F

Ph-CO-C(OCH$_3$)(Ph)-CH$_2$OH + F(CF$_2$)$_8$CH$_2$CH$_2$I $\xrightarrow{\text{NaOH}}{\text{DMSO}}$ Ph-CO-C(OCH$_3$)(Ph)-CH$_2$OCH$_2$CH$_2$(CF$_2$)$_8$F Ph-CO-C(OH)(Ph)-CH$_2$OH +

F(CF$_2$)$_n$CH$_2$CH—CH$_2$ (epoxide) $\xrightarrow{\text{KOH}}$

-continued

Ph-CO-C(OH)(Ph)-CH$_2$OCH$_2$CH(OH)CH$_2$(CF$_2$)$_n$F $$HO-\underset{CH_3}{\underset{|}{\overset{CH_3O}{\overset{|}{C}}}}-\overset{O}{\overset{\|}{C}}-\text{C}_6\text{H}_4-O(CH_2)_2OH +$$

F(CF$_2$)$_n$CH$_2$CH—CH$_2$ (epoxide) $\xrightarrow{\text{Al}_2\text{O}_3}$ $$HO-\underset{CH_3}{\underset{|}{\overset{CH_3O}{\overset{|}{C}}}}-\overset{O}{\overset{\|}{C}}-\text{C}_6\text{H}_4-O(CH_2)_2OCH_2CH(OH)CH_2(CF_2)_nF$$

$$HO-\underset{CH_3}{\underset{|}{\overset{CH_3O}{\overset{|}{C}}}}-\overset{O}{\overset{\|}{C}}-\text{C}_6\text{H}_4-OH + F(CF_2)_8CH_2CH_2I \xrightarrow{\text{KOH}}{\text{DMSO}}$$

$$HO-\underset{CH_3}{\underset{|}{\overset{CH_3O}{\overset{|}{C}}}}-\overset{O}{\overset{\|}{C}}-\text{C}_6\text{H}_4-OCH_2CH_2(CF_2)_8F$$

F-photoinitiators which are acetals of fluoroalkyl terminated alcohols can be made by mono-acetalization of aromatic 1,2-diketones with fluoroalkyl alcohols or with fluoroalkyl terminated halides. The process for making these acetal type products may be exemplified by the following scheme:

Ph-CO-CO-Ph + C$_3$F$_7$CH$_2$OH $\xrightarrow{\text{SOCL}_2}$

Ph-CO-C(Ph)(CH$_2$C$_3$F$_7$)$_2$

Ph-CO-CO-Ph + F(CH$_2$)$_8$CH$_2$CH$_2$OH $\xrightarrow{(\text{CF}_3\text{SO}_2)_2\text{O}}$ Ph-CO-C(Ph)[OCH$_2$CH$_2$(CF$_2$)$_8$F]$_2$ -continued
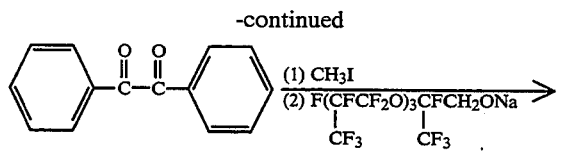
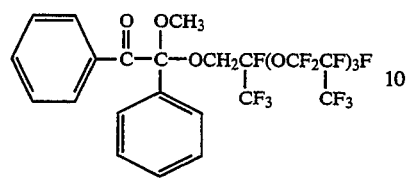
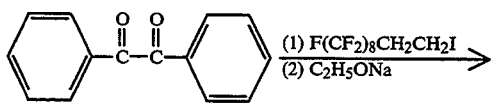
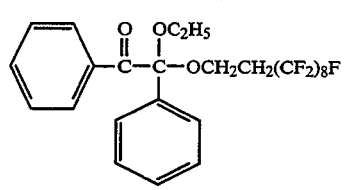
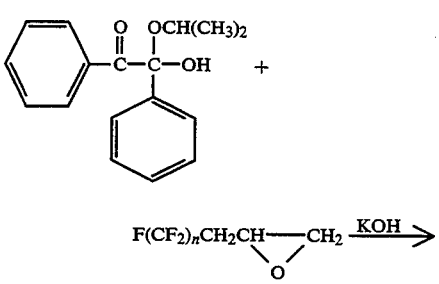
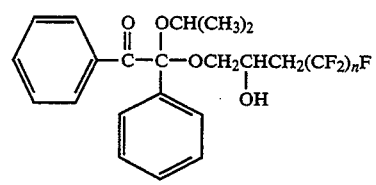
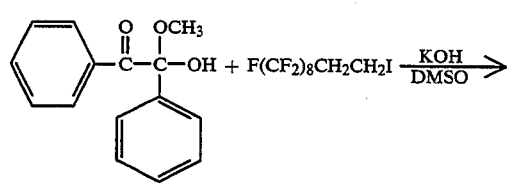
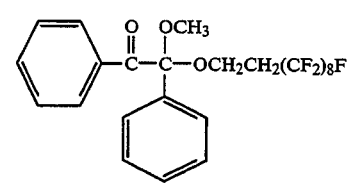
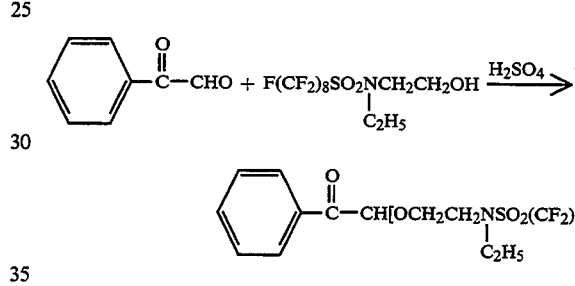
F-photoinitiators in which the fluoroalkyl is attached through C—C bonding can be made by methods exemplified by the following scheme:
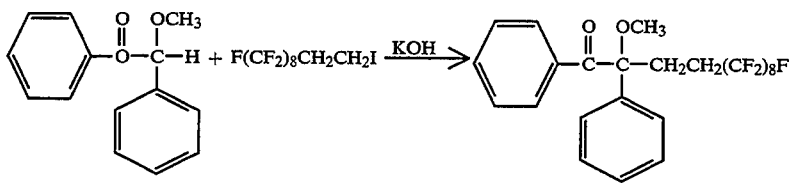
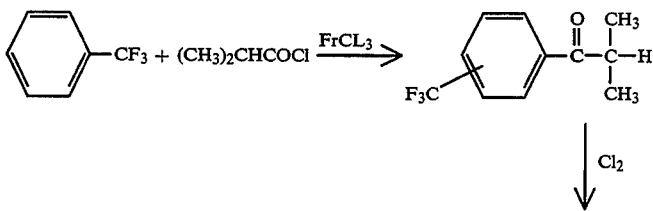

-continued

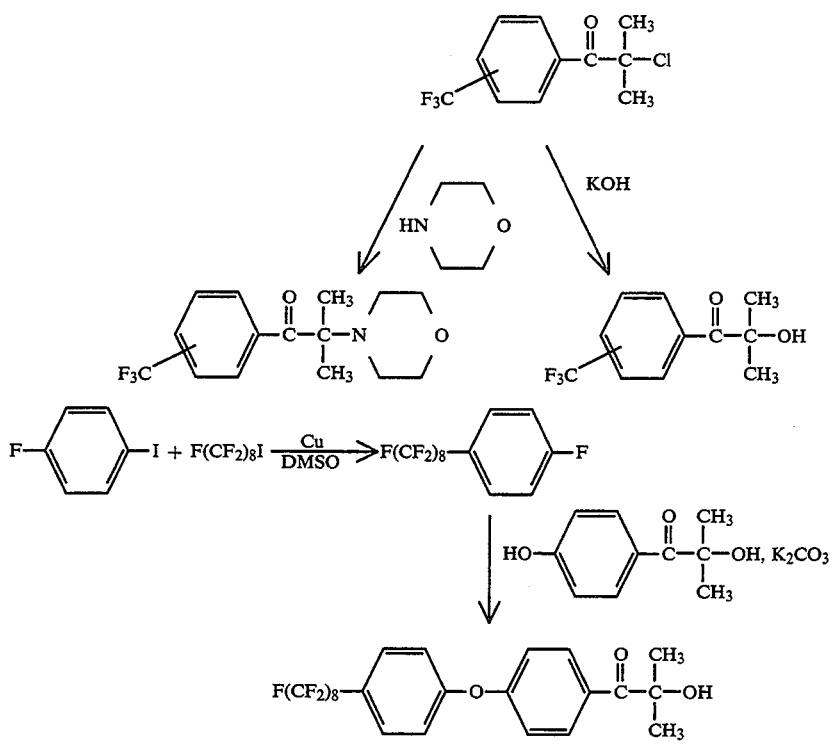

The methods involved in attaching the fluorinated moiety to the above described aromatic ketone type photoinitiators to obtain the F-photoinitiators follow procedures conventionally employed in organic synthesis and are well known to those skilled in the art.

The examples set forth below further illustrate the invention and set forth the best mode presently contemplated for its practice

EXAMPLE 1

Preparation of the compound

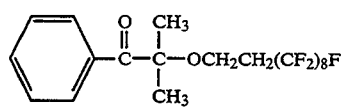

To a stirred mixture of 4.8 parts of α-hydroxymethyl benzoin, 2.2 parts of triethylamine, and 15 parts of anhydrous tetrahydrofuran at room temperature was slowly added 8.8 parts of perfluorooctanoyl chloride in 5 parts of tetrahydrofuran. After stirring for two hours, the solvent was evaporated on a rotavapor. The solid residue was redissolved in 100 parts of ethyl ether, washed four times with 200 parts of saline solution and dried over anhydrous magnesium sulfate. The viscous liquid residue was chromatographed on a silica gel column using a 1:2 methylene chloride-hexane mixture as eluent to give 11 parts of a pale yellow solid having the above structure, as was confirmed by proton, carbon-13 and fluorine NMR, as well as by mass spectra.

EXAMPLE 2

Preparation of the compound

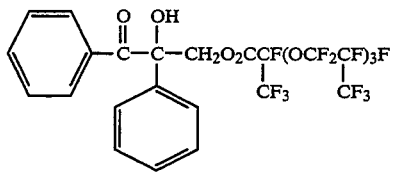

To a stirred mixture of 4.8 parts of α-hydroxymethyl benzoin, 2.3 parts of triethylamine, and 20 parts of methylene chloride at room temperature was slowly added 14 parts of perfluoro-2,5,8-trimethyl-3,6,9-trioxadodecanoyl fluoride (HFPO tetramer, acid fluoride) dissolved in 5 parts of 1,1,2-trichlorotrifluoroethane over a 2 hour period. After stirring for another two hours, the reaction mixture was washed four times with 200 parts of saturated saline solution and dried over anhydrous magnesium sulfate. The viscous liquid remaining after removal of the solvent was chromatographed on a silica gel column using a 1:2 methylene chloride-hexane mixture as eluent to give 18 parts of a viscous, pale liquid product. Its structure was consistent with the above formula, as confirmed by proton, carbon-13 and fluorine NMR, as well as by mass spectra.

EXAMPLE 3

Preparation of the Compound

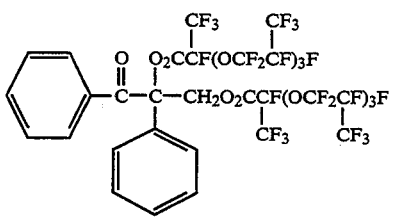

To a stirred mixture of 4.8 parts of α-hydroxymethyl benzoin, 2.3 parts of triethylamine, and 20 parts of methylene chloride at room temperature was slowly added 30 parts of perfluoro-2,5,8-trimethyl-3,6,9- trioxadodecanoyl fluoride (HFPO tetramer, acid fluoride) dissolved in 10 parts of 1,1,2-trichlorotrifluoroethane over a 2 hour period. After stirring for another two hours, the reaction mixture was loaded on top of a silica gel packed column and eluted with a 1:5 methylene chloride-hexane mixture to give 25 parts of a viscous, pale liquid product, having the above structure as confirmed by proton, carbon-13 and fluorine NMR, as well as by mass spectra.

EXAMPLE 4

Preparation of the compound

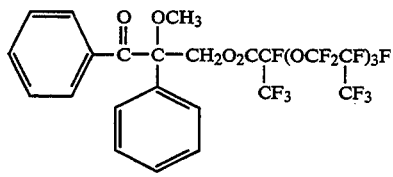

To a stirred mixture of 3.2 parts α-hydroxymethyl benzoin methyl ether, 2.5 parts of triethylamine, 20 parts of methylene chloride and 20 parts of 1,1,2-trichlorotrifluoroethane was slowly added 10 parts of perfluoro-2,5,8-trimethyl-3,6,9-trioxadodecanoyl fluoride (HFPO tetramer, acid fluoride) dissolved in 10 parts of 1,1,2-trifluorotrichloroethane during a 0.5 hour period. After stirring overnight, the reaction mixture was washed four times with 50 parts of saturated saline solution and dried over anhydrous magnesium sulfate. The viscous liquid (8.0 parts) remaining after removing the solvent by evaporation was chromatographed on a silica gel column using 1,1,2-trifluorotrichloroethane as eluent to give 3.6 parts of pure product which is a viscous and pale yellow liquid. Its structure was consistent with the above formula, as confirmed by proton, carbon-13 and fluorine NMR, as well as by mass spectra.

EXAMPLE 5

Preparation of the compound

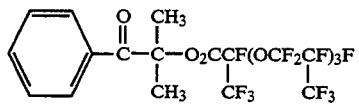

In a stirred solvent mixture of 5 parts ethyl ether and 95 parts of methylene chloride were dissolved, in order, 14 parts of perfluoro-2,5,8-trimethyl-3,6,9-trioxadodecanoic acid, 4.3 parts of 2-hydroxy-2-methyl-1-phenyl-propan-1-one, and 0.2 part of 4-dimethylaminopyridine. To this solution was added 4.8 parts of 1,3-dicyclohexylcarbodiimide suspended in 20 parts of methylene chloride. The resultant mixture was stirred at room temperature for 16 hours and then filtered. The filtrate was washed four times with 100 parts of saline solution and dried over anhydrous magnesium sulfate. The solid remaining after evaporation of the solvent was further purified by elution with 1:1 methylene chloride/hexane in a chromatograph column packed with silica gel to give 9 parts of the solid product. The structure was confirmed by proton, carbon-13 and fluorine NMR, as well as by mass spectra.

EXAMPLE 6

Preparation of the compound

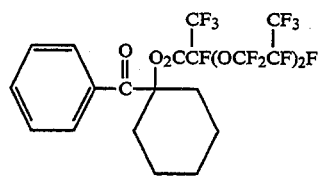

to a stirred solvent mixture of 4.1 parts 1-hydroxylcyclohexyl phenyl ketone, 2 parts of triethylamine and 15 parts of anhydrous tetrahydrofuran were slowly added at room temperature 11 parts of perfluoro-2,5-dimethyl-3,6-dioxanonanoyl fluoride in 5 parts of tetrahydrofuran. The reaction mixture was stirred at room temperature for 2 hours and then evaporated on a rotavapor to remove solvent. The residue was redissolved in ethyl ether and washed four times with 200 parts of saline solution and dried over anhydrous magnesium sulfate. The remaining viscous liquid product was further purified by chromatography in a silica gel packed column eluted with a mixture of 1:2 methylene chloride/hexane to give parts of a pale yellow liquid product; its structure was confirmed by proton, carbon-13 and fluorine NMR, as well as by mass spectra.

EXAMPLE 7

Preparation of the compound

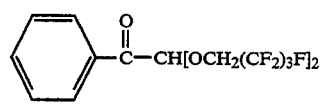

In a stirred flask fitted with a Dean-Stark condenser were placed 12 parts of 1H,1H-heptafluoro-1-butanol, 6.0 parts of phenyl glycoxal, 0.8 part of p-toluenesulfonic acid, and 300 parts of benzene. After 4 days reflux, benzene was removed and the residue was loaded on a chromatograph column packed with silica gel and eluted with a solvent mixture of 1:2 methylene chloride and hexane. Product structure was confirmed by NMR and GC-MS.

EXAMPLE 8

Preparation of Compound

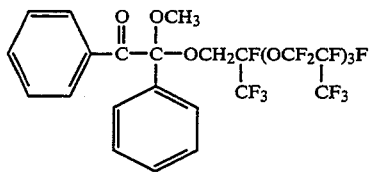

To a stirred solution of 2.1 parts of benzil and 1.8 parts of dimethyl sulfate in 15 parts by volume of tetrahydrofuran at room temperature is added in portions 4 parts of sodium 1H,1H-perfluoro-2,5,8-trimethyl-3,6,9-trioxaundecan-1-olate over a period of 2 hours. The sodium 1H,1H-perfluoro-2,5,8-trimethyl-3,6,9-trioxaundecan-1-olate is made from 1H,1H-perfluoro-2,5,8-trimethyl-3,6,9-trioxaundecan-1-ol and sodium hydride. A solution of 0.6 part of sodium hydroxide in 15 parts by volume of water is then added and the reaction mixture is gently warmed to reflux. After cooling, the mixture is extracted with 1,1,2-trichlorotrifluoroethane and dried over magnesium sulfate. The solution is loaded on a chromatograph column packed with silica gel and eluted with a solvent mixture of 1:2 1,1,2-trichlorotrifluoroethane and hexane.

EXAMPLE 9

Preparation of the compound

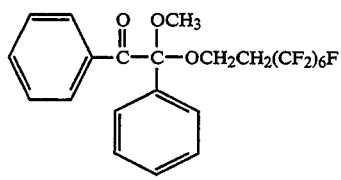

To a stirred solution of 2.1 parts of benzil and 6.6 parts of 1-iodo-1H,1H,2H,2H-perfluorooctane in 15 parts by volume of N,N-dimethylforamide at room temperature is added in portions 0.9 part of sodium methoxide during a period of 2 hours. After stirring for 2 hours, a solution of 0.6 part of sodium hydroxide in 15 parts by volume of water is added and the reaction mixture is gently warmed to reflux. Thereafter, the mixture is extracted with 1,1,2-trichloro-trifluoroethane and dried over magnesium sulfate. The solution is loaded on a chromatograph column packed with silica gel and eluted with a solvent mixture comprised of 1:2 1,1,2-trichlorotrifluoroethane and hexane.

EXAMPLE 10

Preparation of the compound

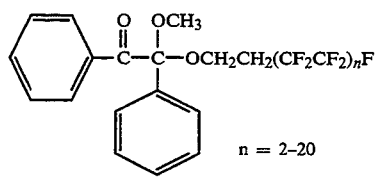

n = 2–20

Method (A).

The procedure of Example 8 is followed except the 1H,1H-perfluoro-2,5,8-trimethyl-3,6,9-trioxaundecan-1-ol is replaced by a mixture of fluoroalkyl alcohol of the structure $F[CF_2CF_2]_nCH_2CH_2OH$ (n=2–20) which is commercially available from dupont as "Zonyl® BA Fluoroalcohol".

Method (B).

The procedure of Example 9 is followed except that the 1-iodo-1H,1H,2H,2H-perfluorooctane is replaced by a mixture of fluoroalkyl iodides represented by the structure $F[CF_2CF_2]_nCH_2CH_2I$ (n=2–20) which is commercially available from dupont as "Zonyl® TELB Fluorotelomer".

EXAMPLE 11

Preparation of the compound

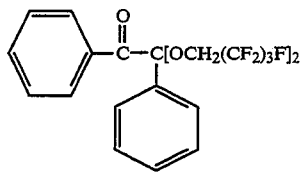

To a stirred, cooled (0° C.) mixture of 2.1 parts of benzil and 2.4 parts of thionyl chloride is slowly added 8 parts of 1H,1H-heptafluoro-1-butanol under cooling to 0° C. After addition, the temperature of the reaction mixture is slowly raised to 500° C. and kept there for 2 hours. Excess thionyl chloride is removed by vacuum distillation, the residue is dissolved in methanol and neutralized with aqueous potassium carbonate solution to give the solid product.

EXAMPLE 12

Preparation of Compound

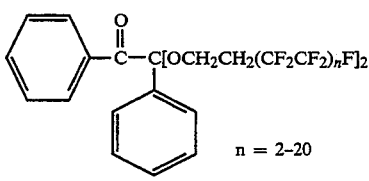

n = 2–20

The procedure of Example 11 is followed except that the 1H,1H-heptafluoro-1-butanol is replaced by a mixture of fluoroalkyl alcohol of the composition $F[CF_2CF_2]_nCH_2CH_2OH$ (n=2–20) ("Zonyl® BA Fluoroalcohol").

EXAMPLE 13

Preparation of the compound

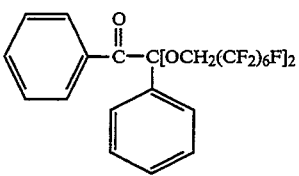

Method (A).

To a stirred solution of 2.1 parts of benzil and 8.8 parts of 1H,1H-perfluoro-1-octanol in 15 parts by volume of dimethylsulfoxide at 0° C. is slowly added 7.0 parts of trifluoromethanesulfonic anhydride over a period of 2 hours. The reaction mixture is then stirred at room temperature for 2 more hours, and is then slowly added to a 5% aqueous potassium carbonate solution.

The mixture is extracted with ethyl ether and dried over magnesium sulfate. The solution is loaded on a chromatograph column packed with silica gel and eluted with a solvent mixture of 1:2 1,1,2-trichlorotrifluoroethane and hexane.

Method (B).

The procedure is same as in Method (A), supra, except that the trifluoromethanesulfonic anhydride is replaced by methanesulfonic anhydride.

EXAMPLE 14

Preparation of the compound

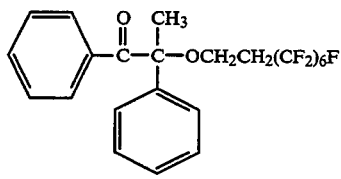

To a stirred solution of 2.0 parts of 2-hydroxy-1,2-diphenyl-propan-1-one in 15 parts by volume of N,N-dimethylforamide at room temperature is added in portions 0.3 part of sodium hydride. After stirring for 1 hour, a solution of 5.7 parts of 1-iodo-1H,1H,2H,2H-perfluorooctane in 10 parts by volume of 1,1,2-trichlorotrifluoroethane is added and the reaction mixture is gently warmed to reflux. After cooling the mixture is poured into water and extracted with 1,1,2-trichlorotrifluoroethane. The solution is loaded on a chromatograph column packed with silica gel and eluted with a solvent mixture comprised of 1:2 1,1,2-trichlorotrifluoro-ethane and hexane to obtain the desired product.

EXAMPLE 15

Preparation of the compound

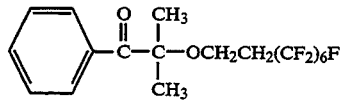

The procedure of Example 14 is followed except that the 2-hydroxy-1,2-diphenyl-propan-1-one is replaced by 2-hydroxy-2-methyl-1-phenyl-propan-1-one.

EXAMPLE 16

Preparation of the compound

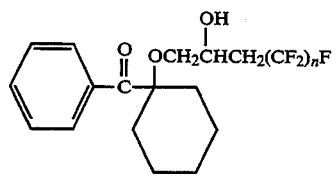

To a stirred solution of 2.0 parts of 1-hydroxycyclohexyl phenyl ketone in 15 parts by volume of N,N-dimethylforamide at room temperature is added in portions 0.3 part of sodium hydride. After 1 hour, 5.0 parts of fluoroalkylepoxide having the formula

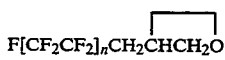

(n=2-20) (duPont's "Zonyl® BA Fluoroalkylepoxide") is added and the reaction mixture is gently warmed to reflux. After cooling, the mixture is poured into water and extracted with 1,1,2-trichlorotrifluoroethane. The solution is loaded on a chromatograph column packed with silica gel and eluted with a solvent mixture of 1:2 1,1,2-trichlorotrifluoro-ethane and hexane to obtain the desired product.

EXAMPLE 17

Preparation of the compound

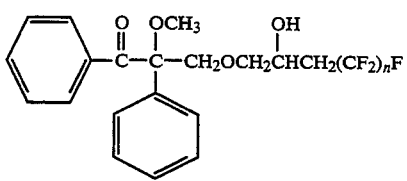

The procedure of Example 16 is followed except that the 1-hydroxycyclohexyl phenyl ketone is replaced by α-hydroxymethyl benzoin methyl ether.

EXAMPLE 18

Preparation of the compound

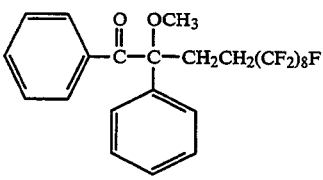

To a stirred suspension of 2.2 parts of benzoin methyl ether and 0.8 part of potassium hydroxide in 15 parts by volume of N,N-dimethylforamide at room temperature is added 7.0 parts of 1-iodo-1H,1H,2H,2H-perfluorooctane and the reaction mixture is gently warmed. After cooling, the mixture is poured into water and extracted with 1,1,2-trichlorotrifluoroethane. The solvent is removed by evaporation, and the remainder is loaded on a chromatograph column packed with silica gel and eluted with a solvent mixture of 1:2 1,1,2-trichlorotrifluoro-ethane and hexane.

EXAMPLE 19

Preparation of the compound

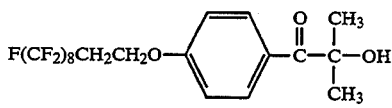

To a stirred suspension of 1.8 parts of 2-hydroxy-2-methyl-1-(4-hydroxyphenyl)-propane-1-one and 0.8 part of anhydrous potassium carbonate in 15 parts by volume of N,N-dimethylforamide at room temperature is added 7.0 parts of 1-iodo-1H,1H,2H,2H-perfluorooctane and the reaction mixture is warmed to and kept at 800° C. for 48 hours. The mixture is poured into water and extracted with 1,1,2-trichlorotrifluoroethane. The solution, after removal of solvent, is loaded on a chromatograph column packed with silica gel and eluted with a solvent mixture comprised of 1:2 1,1,2-trichloro-trifluoro-ethane and hexane.

EXAMPLES 20-51

Photocuring compositions are prepared by dissolving F-photoinitiators of the present invention in fluoroacrylic monomers. The resultant compositions are spread on a glass substrate in an about 10 $\mu$m thick layer (unless otherwise indicated), followed by subjecting the layer under nitrogen cover to UV radiation from a medium pressure mercury lamp at an intensity of 25 mW/cm$^2$. The components of these compositions, their weight proportions, and the results obtained are summarized, infra.

EXAMPLE 20

F-Photoinitiator (A): Product of Example 1
Monomer (B): $CH_2=CHC(O)OCH_2(CF_2)_4CH_2OC(O)CH=CH_2$
Ratio A:B 1:99
Result: Complete cure was achieved after exposure of one minute.

EXAMPLE 21

F-Photoinitiator (A): Product of Example 2
Monomer (B): $[CH_2=CHC(O)OCH_2CF(CF_3)-O-\{CF(CF_3)CF_2O\}_2C_2F_4]_2$
Ratio A:B 2:98
Result: This composition was spin-coated in a 2 $\mu$m thick layer. Irradiation was under nitrogen cover. Complete cure was achieved after exposure of one minute.

EXAMPLE 22

F-Photoinitiator (A): Product of Example 2
Monomer (B): $CH_2=CHC(O)OCH_2-(C_2F_4O)_m-(CF_2O)_n-CH_2OC(O)CH=CH_2$ wherein m/n is about 0.8, and the molecular weight is about 2,000.
Ratio A:B 2:98
Result: This composition was spin-coated in a 5-10 $\mu$m thick layer. Irradiation was under nitrogen cover. Complete cure was achieved after exposure of one minute.

EXAMPLE 23

F-Photoinitiator (A): Product of Example 3
Monomer (B): $CH_2=CHC(O)OCH_2(CF_2)_4CH_2OC(O)CH=CH_2$
Ratio A:B 1:99
Result: No curing occurred after one minute's exposure.

EXAMPLE 24

F-Photoinitiator (A): 1 Part product of Example 3 plus 1 part N,N-dimethylaniline
Monomer (B): $CH_2=CHC(O)OCH_2(CF_2)_4CH_2OC(O)CH=CH_2$
Ratio A:B 1:99
Result: Complete cure was achieved after an exposure of 1 minute.

EXAMPLE 25

F-Photoinitiator (A): Product of Example 4
Monomer (B): $CH_2=CHC(O)OCH_2-(C_2F_4O)_m-(CF_2O)_n-CH_2OC(O)CH=CH_2$ wherein m/n is about 0.8, and the molecular weight is about 2,000.
Ratio A:B 2:98
Result: This composition was spin-coated in a 5-10 $\mu$m thick layer. Irradiation was under nitrogen cover. Complete cure was achieved after exposure of one minute.

EXAMPLE 26

The procedure of Example 20 was repeated except for use of the product of Example 5. No curing occurred after one minute's exposure.

EXAMPLE 27

The procedure of Example 26 was repeated, except for use of an initiator mixture of 1 part product of Example 5 and 1 part of N,N-dimethylaniline. Complete cure was achieved after an exposure of 1 minute.

EXAMPLE 28

(A) The procedure of Example 20 was repeated except for use of the compound of Example 6 as F-photoinitiator. No cure had occured after two minutes' exposure.

(B) The procedure of Example 28(A) was repeated except for use of an initiator mixture of 1 part product of Example 6 and 1 part of N,N-dimethylaniline. Complete cure was achieved after an exposure of 1 minute.

EXAMPLE 29

(A) The procedure of Example 20 was repeated except for use of the compound of Example 7 as F-photoinitiator. No cure had occured after two minutes' exposure.

(B) The procedure of Example 29(A) was repeated except for use of an initiator mixture of 1 part product of Example 7 and 1 part of N,N-dimethylaniline. Complete cure was achieved after an exposure of 1 minute.

EXAMPLES 30-41

The procedure of Example 21 is repeated except for use of the compounds of Examples 8 through 19 as F-photoinitiator. Curing is achieved in each case.

EXAMPLE 42

The procedure of Example 21 is repeated except for use of a 1:1 mixture of $CH_2=CHC(O)OCH_2(CF_2)_4CH_2OC(O)CH=CH_2$ and $[CH_2=CHC(O)OCH_2CF(CF_3)-O-\{CF(CF_3)CF_2O\}_2C_2F_4]_2$. Curing is achieved.

EXAMPLE 43

The procedure of Example 21 is repeated except for use of a 1:1 mixture of $[CH_2=CHC(O)OCH_2CF(CF_3)-O-\{CF(CF_3)CF_2O\}_2C_2F_4]_2$ and $CH_2=CHC(O)OCH_2-(C_2F_4O)_m-(CF_2O)_n-CH_2OC(O)CH=CH_2$ wherein m/n is about 0.8, and the molecular weight is about 2,000. Curing is achieved.

EXAMPLE 44

The procedure of Example 21 is repeated except for use of a 1:1 mixture of $[CH_2=CHC(O)OCH_2CH_2C_7F_{17}$ and $CH_2=CHC(O)OCH_2-(C_2F_4O)_m-(CF_2O)_n-CH_2OC(O)CH=CH_2$ wherein m/n is about 0.8, and the molecular weight is about 2,000. Curing is achieved.

EXAMPLE 45

The procedure of Example 21 is repeated except for use of a 65:35 mixture of $CH_2=CHC(O)OCH_2(CF_2)_4CH_2OC(O)CH=CH_2$ and $CH_2=CHCO(O)CH_2CH_2N(C_2H_5)SO_2C_8F_{17}$. Curing is achieved.

EXAMPLE 46

The procedure of Example 21 was repeated except for substitution of the fluorinated methacrylate $CH_2=C(CH_3)CO(O)CH_2C_7F_{15}$ for the $[CH_2=CHC(O)OCH_2CF(CF_3)-O-\{CF(CF_3)CF_2O\}_2C_2F_4]_2$. Curing is achieved.

EXAMPLE 47

The procedure of Example 21 was repeated except for use of a 65:35 mixture of $[CH_2=CHC(O)OCH_2CF(CF_3)-O\{CF(CF_3)CF_2O\}_2C_2F_4]_2$ and $CH_2=C(CH_3)CO(O)CH_2CH_2N(C_2H_5)SO_2C_8F_{17}$. Curing is achieved.

EXAMPLE 48

The procedure of Example 21 is repeated except for use of a 1:1 mixture of $[CH_2=CHC(O)OCH_2CF(CF_3)-O-\{CF(CF_3)CF_2O\}_2C_2F_4]_2$ and $CH_2=CHCO(O)CH_2C_7F_{15}$. Curing is achieved.

EXAMPLE 49

The procedure of Example 48 is repeated except for use of a 1:1 mixture of $[CH_2=CHC(O)OCH_2CF(CF_3)-O-\{CF(CF_3)CF_2O\}_2C_2F_4]_2$ and $CH_2=C(CH_3)CO(O)CH_2C_7F_{15}$. Curing is achieved.

EXAMPLE 50

A photocuring composition was prepared by dissolving 0.5 part F-photoinitiator of Example 1 together with 1 part of a non-fluorinated photoinitiator, 2-hydroxy-2-methyl-1-phenyl-propane-one-1 in 98.5 parts of a hydrocarbon type triacrylate, ethoxylated trimethylpropane triacrylate $[CH_2=CHC(O)OCH_2CH_2OCH_2]_3CCH_2CH_3$. The resultant composition was spread on a glass substrate in an about 10 μm thick layer. After standing for about 2 minutes, the layer was subjected to UV radiation from a medium pressure mercury lamp at an intensity of 25 mW/cm². Complete cure was achieved after exposure of 1 minute. This example illustrates efficacy of the F-photoinitiators of this invention in photocuring non-fluorinated monomers.

EXAMPLE 51

The procedure of Example 50 is repeated except for use of a 1:1 mixture of $[CH_2=CHC(O)OCH_2CH_2OCH_2]_3CCH_2CH_3$ and N-vinyl pyrrolidone. Cure is achieved. This example, like foregoing example 50, illustrates efficacy of the F-photoinitiators of this invention in photocuring non-fluorinated monomers.

The F-photoinitiators of the present invention are employed in the amounts in which conventional photoinitiators are typically employed for curing acrylates, say in amounts in the order of from about 0.5 to about 5 weight percent of the combined weight of initiator and monomer.

With respect to the photoinitiators of formula (I), supra, the following represent preferred embodiments:

In the $R_f$ groups, Z is preferably fluorine. When $R_f$ is $-(CF_2)_nZ$, then n preferably is an integer of at least 7, more preferably an integer of from about 7 to about 20, if the photoinitiator is intended for curing fluorine-containing acrylic monomers. If the photoinitiator is intended for curing non-fluorinted acrylic monomers, then n preferably is an integer from about 1 to about 7. When $R_f$ is $-CF(CF_3)[OCF_2CF(CF_3)]_nZ$, or $-CF_2-(OCF_2CF_2)_n-(OCF_2)_mZ$, then n preferably is an integer of from about 1 to about 40, more preferably from about 2 to about 20, and m is an integer of from about 0 to bout 40, more preferably from about 1 to about 20.

In the W and Y embodiments in the $-W-(X)_q-Y-R_f$ groups, when either is $-(CH_2)_p-$, then p preferably is an integer of from 0 to about 10, more preferably of from 0 to about 5. The $-(CH_2)_p-$ group is a preferred embodiment for W and Y. When either one or both of W and/or Y are $-(CH_2CH_2O)_p-$ or $-[CH_2CH(OH)CH_2O]_p-$, then p preferably is an integer from 0 to about 5, more preferably from 0 to about 2. W and Y may, but need not be the same. When either one or both of W and Y represent an aromatic group, then the phenylene group is the preferred embodiment.

With regard to those of the $R^1$ through $R^4$ groups which are other than $-W-(X)_q-Y-R_f$, H, $-OH$, R, $-OR$, $-NR^2$ are preferred embodiments, with $-OH$, R and $-OR$ being most preferred. When any of the R substituents in these groups is an alkyl group, then it is preferably an alkyl having from about 1 to about 20 carbons, more preferably from about 1 to about 10 carbons; preferably it is straight chain or branched.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. The method of curing a fluorinated acrylic monomer which comprises mixing said fluorinated acrylic monomer with a fluorine-containing photoinitiator of the formula

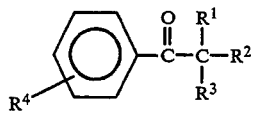

wherein at least one of the $R^1$ through $R^4$ groups is a terminally fluorinated group of the formula

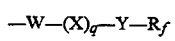

wherein

W and Y are independently selected groups of the formula

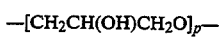

wherein p is an integer of from 0 to 10, and $-Ar-$, wherein Ar is

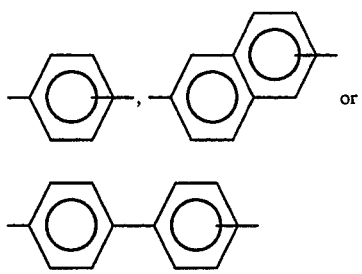

x is —O—, —OC(O)—, —C(O)O— or —C(O)—;
q is 0 or 1; and
$R_f$ is selected from the group consisting of —$(CF_2)_nZ$ —$CF(CF_3)[OCF_2CF(CF_3)]_nZ$ and —$CF_2$—$(OCF_2CF_2)_n$—$(OCF_2)_mZ$ wherein
m is an integer of from 0 to 40; and
n is an integer of from 1 to 40; and
Z is H or F;
wherein the remaining $R^1$ through $R^4$ groups, if any, are independently selected from the group consisting of
H, —OH, R, —OR, —$NR_2$ and

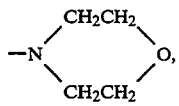

wherein R is alkyl, straight chain, branched or cyclic, having from 1 to 20 carbons; phenyl, biphenyl or naphthyl;
with the proviso that no more than 2 of the $R^1$ through $R^4$ groups may be H; and subjecting the resultant mixture to actinic radiation.

2. The method of claim 1 wherein the fluorinated acrylate monomer is selected from the group consisting of fluoroacrylates of the Formula (A) and Formula (B), wherein Formula (A) is $R_F$—X—A wherein
$R_F$ is a per- or polyfluorinated saturated, monovalent, nonaromatic, aliphatic radical which may be straight chain, branched or cyclic;
A is an ethylenically unsaturated group selected from the group consisting of

—O—C(O)—CR=$CH_2$;

—O—C(O)NH—$(CH_2)_a$—O—C(O)—CR=$CH_2$; and

—O—C(O)NH—R'—NHC(O)O—$(CH_2)_a$—O—C(O)—CR=$CH_2$;

wherein
R is H or $CH_2$; 
a is an integer of from 2 to 6;

R' is a divalent aliphatic or cycloaliphatic bridging group having 2 to 14 carbon atoms, or an aryl group having 6 to 14 carbon atoms; and
X is a divalent bridging group selected from the group consisting of —$SO_2$—N(R'')—$(CH_2)_b$—;

—$(CH_2)_{b^1}$—; and

—C(O)—N(R'')—$(CH_2)_b$— wherein
b is an integer of from 2 to 12;
$b^1$ is an integer of from 1 to 12;
R'' is H; lower alkyl having 1 to 4 carbons; or carbons; or —$(CH_2)_c$—A wherein A is as described above and c is 2 or 3;
with the proviso that when R'' is —$(CH_2)_c$—A, then b is 2 or 3
and with the further proviso that when $R_F$ contains 6, 7 or more than 7 carbon atoms there are no more than 6, 10 or 20 atoms respectively in the chain between $R_F$ and the ester oxygen of the acrylate or methacrylate group; and Formula (B) is Z—$R_f^2$—Y—$(A)_n$ wherein
A is as defined in connection with Formula (A), above;
Y is —$(CH_2)_{b^1}$—, —C(O)—N($R^2$)$(CH_2)_b$— or
—$CH_2$—CH—$CH_2$— where
b is an integer of from 2 to 12;
$b^1$ is an integer of from 1 to 12;
$R^2$ is hydrogen or alkyl having 1 to 4 carbon atoms or —$(CH_2)_c$—A wherein A is as defined in connection with Formula (A), above, and c is an integer of from 2 to 3,
with the proviso that when $R^2$ is —$(CH_2)_c$—A, then b is 2 or 3;
$R_F^2$ is a divalent poly(fluorooxyalkylene) group having a number average molecular weight from about 500 to 20,000, or higher, and preferably of from about 1,000 to about 10,000; and
Z is $CF_3O$—, $CF_3OCF(CF_3)O$—, or Y—A wherein Y and A are as defined in connection with Formula (A), above.

3. The method of claim 1 wherein said fluorine-containing photoinitiator has a fluorinated moiety selected from the group consisting of —$(CF_2)_nF$, —$CF(CF_3)[OCF_2CF(CF_3)]_nF$ and —$CF_2$—$(OCF_2CF_2)_n$—$(OCF_2)_mF$ wherein m and n are integers of from 0 to 40.

4. The method of claim 1 wherein said fluorine-containing photoinitiator has a terminal —$(CF_2)_nF$ moiety.

5. The method of claim 1 wherein said fluorine-containing photoinitiator has a terminal —$CF(CF_3)[OCF_2CF(CF_3)]_nF$ moiety.

6. The method of claim 1 wherein said fluorine-containing photoinitiator has a terminal —$CF_2$—$(OCF_2CF_2)_n$—$(OCF_2)_mF$ moiety.

* * * * *